United States Patent [19]

Neumann et al.

[11] 4,333,214
[45] Jun. 8, 1982

[54] WIRE WELDMENT DEFLASHING TOOL

[75] Inventors: Harry C. Neumann, Alsip; Frank G. Skiba, Villa Park, both of Ill.

[73] Assignee: Western Electric Company, Inc., New York, N.Y.

[21] Appl. No.: 135,599

[22] Filed: Mar. 31, 1980

[51] Int. Cl.³ .............................................. B23D 71/04
[52] U.S. Cl. .......................................... 29/80; 29/78;
51/205 R; 81/9.5 R; 81/9.5 B
[58] Field of Search ................. 81/9.5 B, 9.5 R;
51/205 R, 205 WG, 354; 15/210 A, 210 B;
29/78, 80

[56] References Cited

U.S. PATENT DOCUMENTS

| 1,065,679 | 6/1913 | Gregson et al. | 81/9.5 R |
|---|---|---|---|
| 2,865,100 | 12/1958 | Gilbert | 30/280 |
| 2,920,511 | 1/1960 | Johnson | 228/3.1 |
| 2,922,218 | 1/1960 | Lewis | 29/78 |
| 2,945,117 | 7/1960 | Harris et al. | 83/914 |
| 2,992,483 | 7/1961 | Ricci | 30/280 |
| 3,227,851 | 1/1966 | Greenberger | 83/914 |
| 3,343,245 | 9/1967 | Sylvester | 29/78 |
| 3,375,693 | 4/1968 | Hougen | 29/81 |
| 3,717,895 | 2/1973 | McFarland et al. | 29/81 |
| 3,790,058 | 2/1974 | Filkhorn | 83/914 |

FOREIGN PATENT DOCUMENTS

| 190414 | 6/1957 | Fed. Rep. of Germany | 51/205 R |
|---|---|---|---|
| 1324321 | 7/1973 | United Kingdom | 81/9.5 R |

*Primary Examiner*—William R. Briggs
*Assistant Examiner*—Jerry Kearns
*Attorney, Agent, or Firm*—R. P. Miller

[57] ABSTRACT

A weldment bulge (12) joining together two small diameter wire sections (10 and 11) is removed by a hand-held tool (16) having two facing file sections (24 and 34) which are moved back and forth along and about the weldment to abrade away the bulge portion without abrading the wire sections immediately adjacent to the weldment. The tool includes a U-shaped flexible band (16) for moving support blocks (22 and 31) and file sections (24 and 34) toward each other to engage opposite sides of a weldment bulge.

2 Claims, 3 Drawing Figures

WIRE WELDMENT DEFLASHING TOOL

FIELD OF THE INVENTION

This invention relates to a wire weldment deflashing tool, and more particularly to a hand-held tool which may be moved back and forth along a thin wire to remove a weldment bulge or a flashing resulting from a coldwelding together of two sections of wire.

BACKGROUND OF THE INVENTION

In the manufacture of one type of insulated wire, bare wire is advanced through a bath of a latex adhesive and then passed through a wiping die which is slightly larger than the diameter of the wire. The latex wire is subsequently passed through apparatus which functions to apply pulp insulation. In other types of wire insulating processes, continuous lengths of wire are advanced through an extruder die which functions to apply a coating of plastic insulating material. In order to provide a continous supply of wire to these apparatuses, wire sections are welded together usually by a cold-welding process.

In a coldwelding process the end section of the exhausted wire is forcibly abutted against the leading end section of a new wire with sufficient force to cold flow and fuse the abutted end surfaces of the respective wires. The wire metal at the weld joint bulges outwardly and may form a circumferential flash about the weld.

The resulting bulbous weldment should be removed prior to advance through a wiping or extruder die. If the weldment bulge is not removed, there is a possibility of either damage to the die or a break in the wire upon impact of the weldment bulge against the inner surface of the die.

If the weldment passes through the die, another detrimental situation may evolve in that the insulation applied to the weldment bulge will be thinner than the insulation on the remainder of the wire. When wires with thin insulation spots are subsequently cabled with other wires, there is a possibility that the weldment bulge will break through the jacketing insulation and through the insulation on one or more adjacent wires to form shorts in the cable.

Heretofore, the usual practice utilized to remove weldment bulges from small diameter wire, e.g., 26-gauge or the like, has been to rub an emery or other abrasive coated cloth or paper back and forth along the wire. However, during the coldwelding operation, the weldment is work hardened or embrittled, thus the rubbing of the emery cloth results in an erosion of the wire on both sides of the weldment. Obviously, these reduced wire sections lead to breaks in the wire during subsequent processing of the wire through various types of equipment, such as wire pair twistors or cabling machines. These breaks result in lost production time, in making repairs and in re-stringing the wire through the processing machine.

Many prior art devices have been developed in an attempt to remove weldment bulges. More particularly, there is shown in the prior patent art, as exemplified by U.S. Pat. No. 2,920,511 issued Jan. 12, 1960 to K. F. Johnson, U.S. Pat. No. 2,945,117 issued July 12, 1960 to Harris et al. and U.S. Pat. No. 3,790,058 issued Feb. 5, 1974 to Filkorn, coldwelding or hotwelding equipment for fusing the end of one wire onto the end of a second wire. These apparatuses also include weldment bulge removal facilities which contemplate movement of one or more conical cutters relative to and along the axes of the joined wires to shear the weldment bulge. These apparatuses are expensive and require maintenance in that the conical tools must be removed and sharpened on a frequent schedule.

SUMMARY OF THE INVENTION

The invention contemplates, among other things, a hand-held tool which can be moved back and forth over a weldment bulge joining two wire sections to abrade the weldment bulge without undercutting the wire sections adjacent to the weldment.

More particularly, a substantially U-shaped band of resilient material is provided with a pair of tool holder blocks mounted in a facing arrangement at the ends of the bands. Each block has a channel formed therein for receiving and mounting a cutting or abrading element. The exposed faces of the abrading element are seated beneath the level of the facing end sections of the block. In use, the operator flexes the band to move the abrading surfaces into engagement with the weldment bulge. The tool is manipulated back and forth along the axis of the wire and also rotated about the wire to abrade away the weldment bulge. The slightly projecting end wall surfaces of the blocks engage the wire and preclude the erosion of the wire on either side of the weldment.

In addition, one of the blocks may be provided with a pair of extending guide plates to envelop the other block during the abrading operation. These plates act to hold the abrading surfaces in alignment during the manipulation of the tool.

BRIEF DESCRIPTION OF THE DRAWINGS

A more complete understanding of the invention may be had by referring to the following detailed description when considered in conjunction with the accompanying drawings, wherein.

Figure 1:
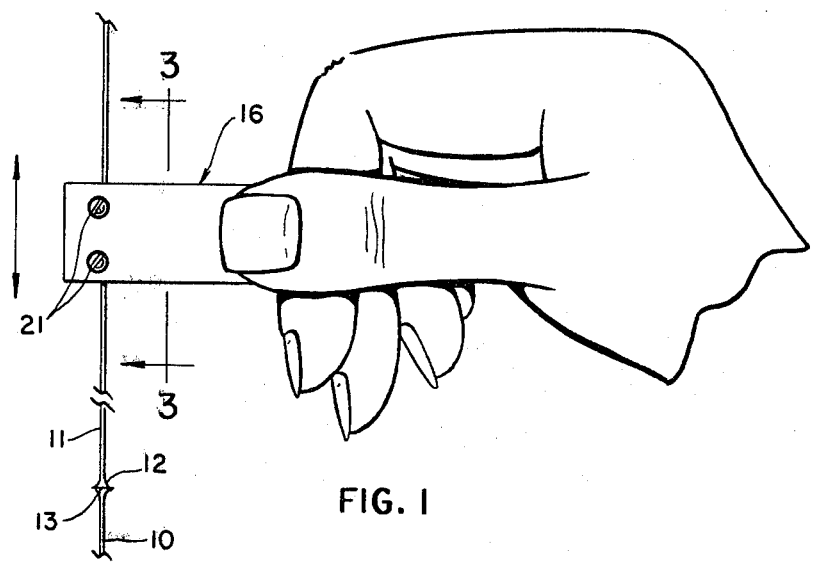
FIG. 1 is a view illustrating the use of a weldment bulge removal tool embodying the principles of the present invention.
Figure 3:
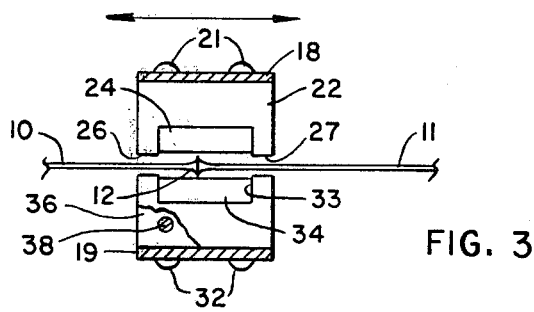
FIG. 3 is a view partially in section with the pair of guide plates cut away, taken along line 3—3 of FIG. 1, showing a pair of abrading elements and support blocks positioned over a weldment bulge to be removed from the juncture of joined wire sections.

Referring to the drawing and particularly to FIGS. 1 and 3, there are shown a pair of wires 10 and 11 joined by a weldment 12. The wires 10 and 11 are joined by a coldwelding process and as a result a weldment bulge is formed along with, perhaps, a circumferential band of flash 13. The tool of the present invention is designed to abrade the bulge without undercutting the wire sections on either side of the weldment.

Figure 2:
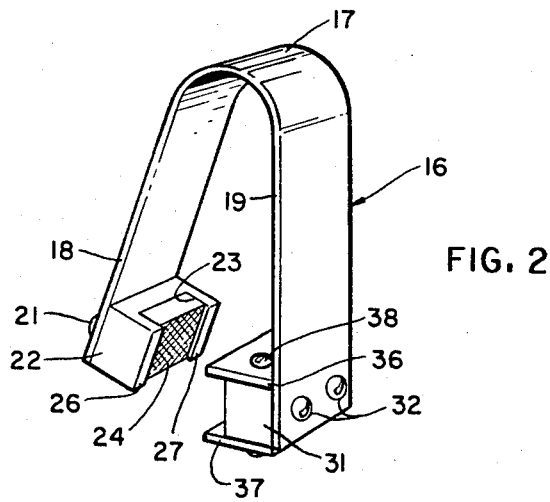
FIG. 2 is a perspective view of the tool particularly showing the mounting of the abrading elements and a pair of guide plates.

The tool (see FIG. 2) comprises a substantially U-shaped band 16 constructed of hard brass or tempered steel. The band consists of an arcuate bight section 17 and two depending and diverging arms 18 and 19. Attached by screws 21 to the lower section of the arm 18 is a first block 22. This block is machined to provide a channel or slot 23. A cutting member in the form of a file section 24 is adhesively secured within the slot 23. The thickness of the file section 24 is selected so that an abrading surface is slightly below the surfaces 26 and 27 of the adjoining side walls forming the slot. It has been found that a file surface graded "bastard fineness" is effective to abrade the weldment.

A second block 31 is secured by screws 32 to the lower end of the other arm 19. This block is provided with a slot 33 (see FIG. 3) for adhesively mounting a second file section 34. Again, the file surface is located slightly below the surface of the side walls defining the slot 33. A pair of guide plates 36 and 37 are secured by fasteners 38 to the upper and lower surfaces of the block 31. When the band 16 is flexed to move the blocks 22 and 31 toward each other, the plates 36 and 37 are moved into overlaying relationship with the block 22 so that the file sections 24 and 34 are held in alignment with each other.

In use of the tool, an operator will grasp the band 16 between his thumb and forefinger, as shown in FIG. 1, and place the file sections 24 and 34 over the weldment 12 as shown in FIG. 3. The band is flexed to move the file sections into engagement with the weldment, and then the tool is moved back and forth, parallel to the axes of the wires 10 and 11. During the back and forth movement, the tool is also manipulated about the wire 10–11 to abrade away the projecting weldment bulge and flash. Inasmuch as the surfaces of the file sections 24 and 34 are below the adjoining surfaces of the channel walls, the file sections only act on the weldment. During the back and forth movement there may be some buckling of the wire but this action only thrusts the weldment against the abrading file surfaces. The wire sections immediately adjacent to the weldment are engaged by the channel wall and are not abraded.

What is claimed is:

1. A tool for removing a bulbous portion from a wire, which comprises:
   a generally U-shaped resilient band having a pair of opposed end sections with facing inside surfaces;
   a first block secured to the inside facing surface of a first end section of said resilient band, a second block secured to the inside facing surface of the second end section of said resilient band and positioned to engage said first block when said band is compressively flexed;
   said first and second blocks each provided with a recess of predetermined depth;
   a first abrading member mounted in a first of said recesses and a second abrading member mounted in the other of said recesses, said abrading members each having a thickness which is slightly less than said predetermined depth of said recess in which the abrading member is mounted; and
   a pair of guide plates secured to one of said blocks for guiding the blocks into juxtaposition upon flexing of said band to move the blocks toward each other.

2. A tool for removing enlargements from wire, which comprises:
   a U-shaped band of resilient material having a pair of arms with inside surfaces facing each other;
   a first block secured to the inside surface of a first arm of said U-shaped band, said block having a first channel former therein;
   a first cutting member having a file-like exposed surface mounted in said first channel;
   a second block secured to an inside surface of the other arm of said U-shaped first band, said block having a channel formed therein;
   a second cutting member having a file-like exposed surface mounted in said second channel; and
   a pair of guide plates secured respectively to the upper and lower surfaces of one of said blocks and having sections extending beyond the facing surfaces of said blocks for guiding the blocks into juxtaposition when the band is flexed to move the blocks toward each other.

* * * * *